(12) United States Patent
Suzuki et al.

(10) Patent No.: US 10,487,888 B2
(45) Date of Patent: Nov. 26, 2019

(54) ONE-WAY CLUTCH

(71) Applicants: TOYOTA JIDOSHA KABUSHIKI KAISHA, Toyota-shi, Aichi-ken (JP); NSK-WARNER K.K., Tokyo (JP)

(72) Inventors: Michinobu Suzuki, Toyota (JP); Yuji Iwase, Mishima (JP); Shotaro Kato, Susono (JP); Michitaka Tsuchida, Miyoshi (JP); Yota Mizuno, Nissin (JP); Koichi Kato, Toyota (JP); Takaya Yamada, Kakegawa (JP); Hiroyuki Ohishi, Hamamatsu (JP); Tomoyuki Miyazaki, Kakegawa (JP)

(73) Assignees: TOYOTA JIDOSHA KABUSHIKI KAISHA, Toyota (JP); NSK-WARNER K.K., Tokyo (JP)

( * ) Notice: Subject to any disclaimer, the term of this patent is extended or adjusted under 35 U.S.C. 154(b) by 403 days.

(21) Appl. No.: 15/363,497

(22) Filed: Nov. 29, 2016

(65) Prior Publication Data
US 2017/0159727 A1 Jun. 8, 2017

(30) Foreign Application Priority Data
Dec. 2, 2015 (JP) .................................. 2015-236123

(51) Int. Cl.
*F16D 41/12* (2006.01)
*F16D 41/00* (2006.01)

(52) U.S. Cl.
CPC .................................. *F16D 41/12* (2013.01)

(58) Field of Classification Search
CPC ....................................................... F16D 41/12
See application file for complete search history.

(56) References Cited

U.S. PATENT DOCUMENTS

| 1,883,966 A * | 10/1932 | Krause ..................... F16D 41/12 192/46 |
| 2,134,405 A * | 10/1938 | Hulshizer ............. E21B 19/081 173/156 |
| 4,842,109 A | 6/1989 | Avny |
| 6,557,681 B2 * | 5/2003 | Kinoshita ............... F16D 41/18 192/107 M |
| 7,448,481 B2 * | 11/2008 | Kimes ..................... F16D 41/12 192/103 B |

(Continued)

FOREIGN PATENT DOCUMENTS

| CN | 103511505 A | 1/2014 |
| JP | 2006-250352 A | 9/2006 |

(Continued)

*Primary Examiner* — Charles A Fox
*Assistant Examiner* — Ryan P Dodd
(74) *Attorney, Agent, or Firm* — Oliff PLC

(57) ABSTRACT

Since one end of a spring is received by a planar portion of a spring seat provided on any one of an outer plate and an inner plate, it is possible to support the spring with a planar member without machining a bottom wall face of the outer plate into a planar shape. Since the spring seat has seat guide portions that contact the outer plate, it is possible to suppress the fluctuation of the spring seat and the fluctuation of the spring by the seat guide portions, so it is possible to reliably prevent interference of the spring with its peripheral portion. Therefore, a load on the spring is reduced, so it is possible to improve the durability of a one-way clutch.

5 Claims, 3 Drawing Sheets

(56) References Cited

U.S. PATENT DOCUMENTS

| | | | |
|---|---|---|---|
| 7,500,548 B2 * | 3/2009 | Kimes | F16D 41/12 |
| | | | 192/46 |
| 2006/0021837 A1 | 2/2006 | Kimes et al. | |
| 2012/0000032 A1 | 1/2012 | Van De Veen et al. | |
| 2015/0285319 A1 | 10/2015 | Kawai et al. | |
| 2016/0348741 A1 * | 12/2016 | Niemiec | F16D 41/12 |

FOREIGN PATENT DOCUMENTS

| | | |
|---|---|---|
| JP | 2008-020075 A | 1/2008 |
| JP | 2011-106527 A | 6/2011 |
| JP | 2011-174530 A | 9/2011 |
| JP | 2012-520719 A | 9/2012 |
| JP | 2015-197201 A | 11/2015 |
| WO | 1999/045289 A1 | 9/1999 |

* cited by examiner

ONE-WAY CLUTCH

INCORPORATION BY REFERENCE

The disclosure of Japanese Patent Application No. 2015-236123 filed on Dec. 2, 2015 including the specification, drawings and abstract is incorporated herein by reference in its entirety.

BACKGROUND

1. Technical Field

The present disclosure relates to the structure of a one-way clutch and, more particularly, to improvement in the durability of a one-way clutch.

2. Description of Related Art

There is well known a one-way clutch including an inner plate, an outer plate and ratchet mechanisms. The ratchet mechanisms permit relative rotation of these inner plate and outer plate in one direction, and stop relative rotation in the other direction. In a one-way clutch described in International Application Publication No. 1999/45289, pawls (pawl members) are assembled to an outer plate (outer race member), and notches are provided in an inner plate (inner race member). The pawls function as ratchet mechanisms. The notches engage with the pawls at the time when the inner plate and the outer plate relatively rotate in the other direction. In addition, a spring is provided between the outer plate and each pawl, and presses the corresponding pawl toward the inner plate.

SUMMARY

In the thus configured one-way clutch, when the outer plate rotates at a low rotation speed, the elastic force of each spring overcomes centrifugal force caused by rotation, and each pawl is pressed against the inner plate. At this time, when the outer plate relatively rotates in one direction with respect to the inner plate, the rotation is permitted; however, when the outer plate relatively rotates in the other direction with respect to the inner plate, the pawls mesh with the notches of the inner plate, with the result that the outer plate and the inner plate are locked so as to be relatively non-rotatable.

In the one-way clutch described in International Application Publication No. 1999/45289, the outer plate has pockets for accommodating the springs, and one end of each spring is in contact with a wall face formed by the corresponding one of the pockets. Each wall face formed by the corresponding pocket and with which one end of the corresponding spring contacts is flat. However, the pockets of the outer plate are usually formed by punching a metal sheet, so it is difficult to obtain sufficient accuracy even when each wall face is formed in a flat shape, and each wall face is actually formed in a circular arc shape. Therefore, one end of each spring contacts the face formed in a circular arc shape. In this case, the position of each spring is not stable. In addition, as the one-way clutch works in a state where any one of the springs is seated in an inclined position, the spring, for example, interferes with a peripheral portion, and a load acts on the spring, with the result of a possibility of decrease in the durability of the one-way clutch.

The present disclosure provides the structure of a one-way clutch that includes a ratchet mechanism and that improves the durability of the one-way clutch.

An example aspect of the present disclosure provides a one-way clutch. The one-way clutch includes a first member, a second member and a ratchet mechanism. The first member is arranged around a rotation axis. The second member is arranged around the rotation axis so as to surround the first member. The ratchet mechanism is provided between the first member and the second member, the ratchet mechanism is configured to permit relative rotation between the first member and the second member in one direction. The ratchet mechanism is configured to stop relative rotation between the first member and the second member in the other direction. The ratchet mechanism includes a pawl, and a spring seat. The pawl is provided on one of the first member and the second member. The pawl is configured to pivot toward the other of the first member and the second member. The spring is provided between the pawl and the one of the first member and the second member. The spring is configured to press the pawl toward the other of the first member and the second member such that the pawl pivots toward the other of the first member and the second member, and a spring seat supports the spring. The spring is connected to the one of the first member and the second member via the spring seat the spring seat includes a planar portion and a pair of guide portions. The planar portion has a planar shape for receiving one end of the spring. The pair of guide portions extends from the planar portion parallel in a direction in which the spring extends or contracts.

With the above configuration, since one end of the spring is received by the planar portion of the spring seat, it is possible to support the spring with a planar member without machining the one of the first member and the second member into a planar shape. Since the spring seat has the guide portions that contact the one of the first member and the second member, it is possible to suppress the fluctuation of the spring seat and the fluctuation of the spring by the guide portions, so it is possible to reliably prevent interference of the spring with its peripheral portion. Therefore, a load on the spring is reduced, so it is possible to improve the durability of the one-way clutch.

The one-way clutch may further be provided that the pair of guide portions of the spring seat may expand away from the spring at a position located a predetermined distance from the planar portion. At least part of portions of the pair of guide portions, is located the predetermined distance from the planar portion, are in contact with the one of the first member and the second member.

With the above configuration, the pair of guide portions of the spring seat expand away from the spring at a position located the predetermined distance from the planar portion, and at least part of the guide portions are in contact with the one of the first member and the second member, so force that suppresses the fluctuation of the spring seat acts on the spring seat between each of the portions of the guide portions, located the predetermined distance from the planar portion, and the one of the first member and the second member, with the result that the position of the spring seat is stable. Even when the spring bends, the guide portions are prevented from getting caught in between the steel wires of the spring.

The one-way clutch may further be provided that the stiffness of the guide portions is lower than the stiffness of the spring.

With the above configuration, since the stiffness of at least the guide portions of the spring seat is lower than the stiffness of the spring, even if the spring bends and contacts the guide portions, it is possible to reduce abrasion of the spring.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the accompanying drawings. In the following embodiments, the drawings are simplified or modified as needed, and the scale ratio, shape and the like, of each portion are not always accurately drawn.

Figure 1:
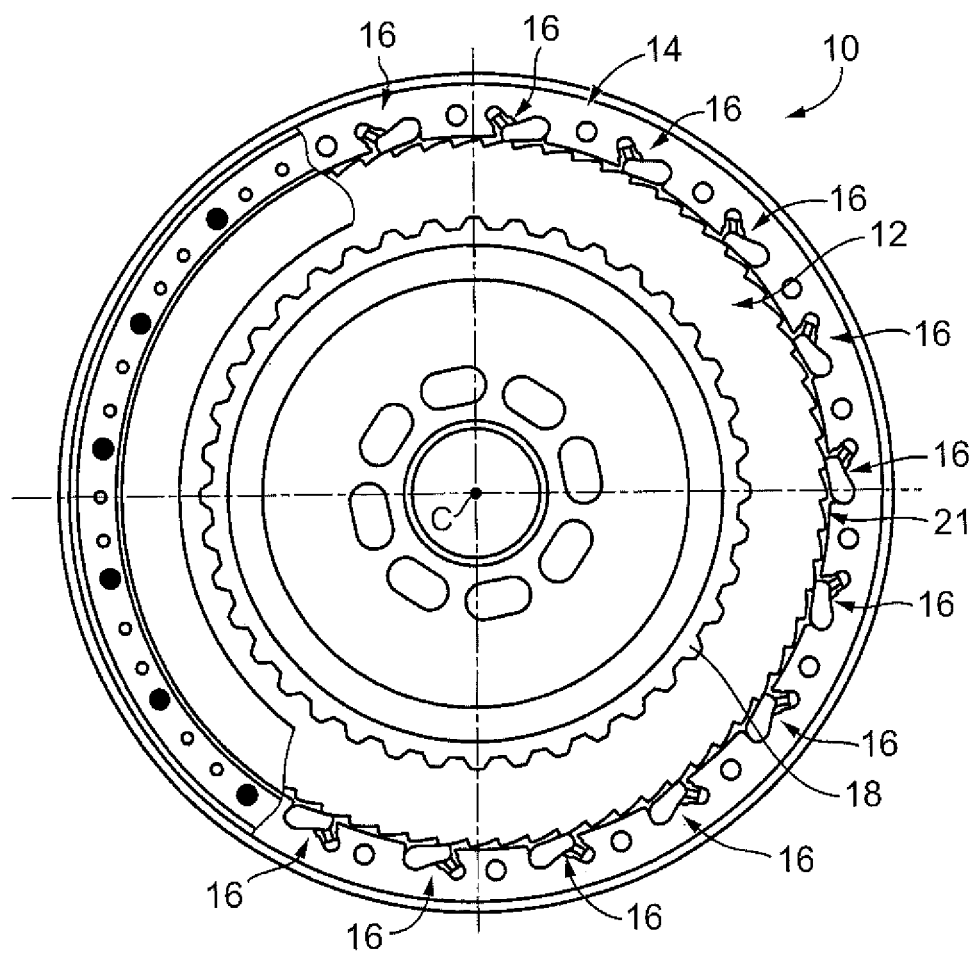
FIG. 1 is a view that shows the overall structure of a one-way clutch according to an embodiment of the present disclosure.

FIG. 1 shows the overall structure of a one-way clutch 10 according to an embodiment of the present disclosure. The one-way clutch 10 is, for example, provided on a crankshaft of an engine (not shown), and is used to, for example, prevent reverse rotation of the crankshaft.

The one-way clutch 10 includes an inner plate 12, an outer plate 14, and a plurality of ratchet mechanisms 16. The plurality of ratchet mechanisms 16 are arranged in the circumferential direction between the inner plate 12 and the outer plate 14. The inner plate 12 corresponds to a first member or the other member according to the present disclosure. The outer plate 14 corresponds to a second member or one member according to the present disclosure.

The inner plate 12 is formed in a disc shape by pressing a flat plate having a predetermined thickness. The inner plate 12 is arranged around a rotation axis C. Rotation of the inner plate 12 is constantly stopped by spline-fitting the inner peripheral portion of the inner plate 12 to a non-rotating member 18. Notches 21 are periodically provided on the outer periphery of the inner plate 12. The notches 21 are engageable with pawls 20 (described later) of the ratchet mechanisms 16.

The outer plate 14 is formed in a disc shape by pressing a flat plate having a predetermined thickness. The outer plate 14 has a circular space at its inner peripheral side. The outer plate 14 is arranged on the outer peripheral side of the inner plate 12 around the rotation axis C so as to surround the inner plate 12.

Figure 2:
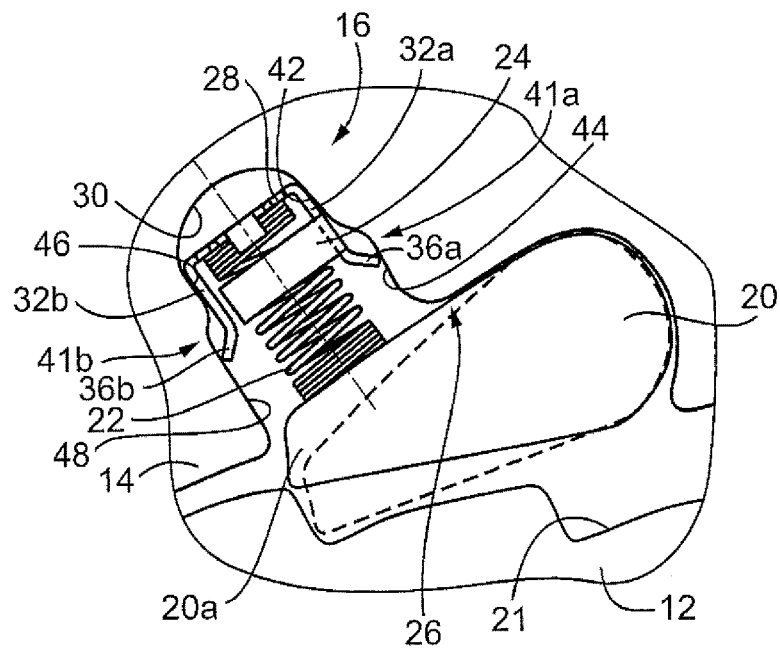
FIG. 2 is an enlarged view of each ratchet mechanism shown in FIG. 1.

The ratchet mechanisms 16 are provided between the inner plate 12 and the outer plate 14. The ratchet mechanisms 16 permit relative rotation between the inner plate 12 and the outer plate 14 in one direction, and stop relative rotation between the inner plate 12 and the outer plate 14 in the other direction. FIG. 2 is an enlarged view of each ratchet mechanism 16 shown in FIG. 1.

Each of the ratchet mechanisms 16 includes the pawl 20 and a spring 22. The pawl 20 is provided on the outer plate 14 in a state where the pawl 20 is pivotable. The spring 22 is provided between the pawl 20 and the outer plate 14, and pivots the pawl 20 toward the inner plate 12 by pressing the pawl 20 toward the inner plate 12. The spring 22 is formed of a coil spring, and is connected to the outer plate 14 via a spring seat 24 that supports the spring 22.

The outer plate 14 has the pockets 26. Each pocket 26 is used to define a space that accommodates the pawl 20, the spring 22 and the spring seat 24. The pockets 26 are formed by pressing (punching).

Each pawl 20 has a predetermined thickness, and is formed so as to be accommodated in a corresponding one of the pockets 26. Each pawl 20 is fitted into the space defined by a corresponding one of the pockets 26 of the outer plate 14, A distal end 20a of each pawl 20 pivots toward one of the notches 21 of the inner plate 12 as indicated by the dashed line in FIG. 2. Specifically, as shown in FIG. 2, each pawl 20 is configured to pivot between a state where the distal end 20a is not engaged with any notch 21 as indicated by the continuous line and a state where the distal end 20a is engaged with one of the notches 21 as indicated by the dashed line. The distal end 20a of each pawl 20 is pressed by the corresponding spring 22 toward a side at which the distal end 20a is engaged with one of the notches 21.

The notches 21 are formed in a sawtooth wave (triangular wave) shape in which a portion having a gentle gradient face that contacts the distal end 20a of the pawl 20 and a portion having a steep gradient face that contacts the distal end 20a of the pawl 20 are alternately formed. Thus, in FIG. 1, when the outer plate 14 rotates in a clockwise direction (one direction), the distal ends 20a of the pawls 20 relatively move along the wall faces of the notches 21 even when the distal ends 20a of the pawls 20 are pressed against the notches 21 of the inner plate 12. Therefore, the distal ends 20a of the pawls 20 do not mesh with the notches 21, so relative rotation between the inner plate 12 and the outer plate 14 is permitted.

On the other hand, in FIG. 1, when the outer plate 14 rotates in a counterclockwise direction (the other direction), and when the distal ends 20a of the pawls 20 are pressed against the notches 21 of the inner plate 12, the distal ends 20a of the pawls 20 mesh with the notches 21 of the inner plate 12, so relative rotation between the inner plate 12 and the outer plate 14 is stopped, and the outer plate 14 is locked so as to be non-rotatable.

When the outer plate 14 rotates at a predetermined rotation speed or higher, the distal end 20a of each pawl 20 is caused to pivot toward the outer plate 14 (radially outward) by centrifugal force against the urging force of the corresponding spring 22 as indicated by the continuous line in FIG. 2. Therefore, the distal end 20a of each pawl 20 does not mesh with any notch 21, so relative rotation between the inner plate 12 and the outer plate 14 is permitted.

One end of each spring 22 in the longitudinal direction is crimped to and supported by the spring seat 24, and the other end of the spring 22 in the longitudinal direction is in contact with the corresponding pawl 20. Each spring seat 24 is fitted so as to be accommodated in the space defined by a corresponding one of the pockets 26 of the outer plate 14. Each spring 22 is small and has a diameter of several millimeters, so the width of the space is also similarly small and is about several millimeters. When the width of such a space defined by pressing is small, it is difficult to forth the wall face, connecting the end points of the space, in a planar shape. Specifically, as shown in FIG. 2, a bottom wall face 30 of the outer plate 14, facing the planar-shaped planar portion 28 (described later) of each spring seat 24, is formed in a circular arc shape. Therefore, when each spring 22 is directly supported by a corresponding one of the bottom wall faces 30 of the outer plate 14, the central axis of the spring 22 tends to fluctuate. In order to eliminate this situation, in the present embodiment, each spring 22 is supported by the planar-shaped planar portion 28 of the corresponding spring seat 24.

Incidentally, the planar portion 28 of the spring seat 24, which supports one end of the spring 22, has a planar shape, and it is required to stably seat the planar portion 28 with respect to the outer plate 14. For example, if a method of machining each pocket 26 is changed and each bottom wall face 30 is formed in a planar shape, the planar portion 28 of each spring seat 24 is in plane contact with the corresponding bottom wall face 30, so the position of each spring seat 24 is stable. However, if each bottom wall face 30 is formed in a planar shape, manufacturing cost significantly increases. Therefore, by forming each spring seat 24 in a shape that will be described later, it is possible to stabilize the position of each spring seat 24 even in a state where each bottom wall face 30 is formed in a circular arc shape.

Figure 3:
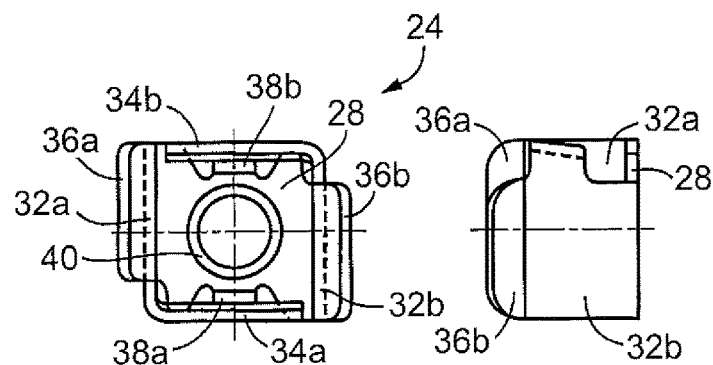
FIG. 3 is a view that illustrates the shape of a spring seat shown in FIG. 2.
Figure 3:
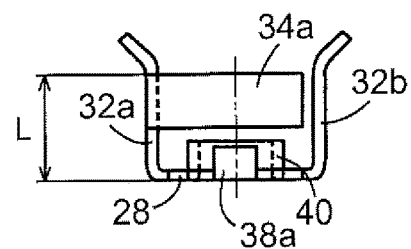

FIG. 3 is a view that shows the shape of each spring seat 24 shown in FIG. 2 in detail. The spring seat 24 is formed so as to surround the spring 22, and includes the planar portion 28, a pair of spring seat guide portions 32a, 32b (hereinafter, seat guide portions 32a, 32b), spring protection portions 34a, 34b and a pair of crimping portions 38a, 38b. One end of the spring 22 in the longitudinal direction is supported by (fixed to) the planar portion 28. The pair of seat guide portions 32a, 32b extend perpendicularly from the planar portion 28. The spring protection portions 34a, 34b extend perpendicularly from the pair of seat guide portions 32a, 32b so as to protect the spring 22. The pair of crimping portions 38a, 38b extend perpendicularly from the planar portion 28. The spring seat 24 is formed of a metal plate (thin plate), and is formed by pressing (punching). The seat guide portions 32a, 32b correspond to a pair of guide portions.

In the planar portion 28, a face that receives the spring 22 is formed in a planar shape. When the planar portion 28 is viewed in a direction perpendicular to the face that receives the spring 22, the planar portion 28 is formed in substantially a rectangular shape. The planar portion 28 has a cylindrical portion 40 at its center. The cylindrical portion 40 is used to position the spring 22. The spring 22 is fitted to the cylindrical portion 40. The pair of crimping portions 38a, 38b are formed so as to be bent substantially perpendicularly with respect to the planar portion 28. The crimping portions 38a, 38b are opposed to each other across the cylindrical portion 40. In fixing the spring 22 to the spring seat 24, the crimping portions 38a, 38b are deformed to be crimped in a state where the spring 22 is fitted to the cylindrical portion 40. In this way, when the spring 22 is supported by the planar portion 28 having a planar shape, the position of the spring 22 is stable and the fluctuation of the central axis of the spring 22 is reduced as compared to the case where the spring 22 is supported by the circular arc bottom wall face 30.

The pair of seat guide portions 32a, 32b are formed by being bent perpendicularly from the planar portion 28. The seat guide portions 32a, 32b face each other across the spring 22 in a state where the spring 22 is connected to the cylindrical portion 40 (see FIG. 2), and extend parallel to the direction in which the spring 22 extends or contracts. The spring protection portions 34a, 34b are formed by being further bent substantially perpendicularly from the corresponding seat guide portions 32a, 32b. The spring protection portions 34a, 34b each are formed in a rectangular shape, and face each other across the spring 22 in a state where the spring 22 is connected. Thus, in a state where the spring 22 is connected, the seat guide portions 32a, 32b and the spring protection portions 34a, 34b are formed so as to surround the spring 22 in all directions. Since the spring protection portions 34a, 34b are formed, even when the spring 22 connected to the planar portion 28 bends, the spring 22 contacts the spring protection portions 34a, 34b, so interference of the spring 22 with a member other than the spring seat 24 is prevented.

Flange portions 36a, 36b are formed in the seat guide portions 32a, 32b at a position located a predetermined distance L from the planar portion 28 so as to be bent at a predetermined taper angle away from each other with respect to the mutually facing seat guide portions 32b, 32a. Therefore, the flange portions 36a, 36b of the seat guide portions 32a, 32b, located the predetermined distance L from the planar portion 28, are expanded away from the spring 22 in a state where the spring 22 is connected.

As shown in FIG. 2, the spring seat 24 is installed such that the planar portion 28 covers the bottom wall face 30 of the outer plate 14 in a state where the spring 22 is connected to the planar portion 28. Wall faces 41a, 41b of the outer plate 14, which contact the spring seat 24, are parallel to the direction in which the spring 22 extends or contracts, and respectively have stepped portions at a position located a predetermined distance from the bottom wall face 30.

Each wall face 41a of the outer plate 14, which contacts the seat guide portion 32a of the corresponding spring seat 24, will be described. The wall face 41a has a first wall face 42 and a second wall face 44. The first wall face 42 contacts a portion of the seat guide portion 32a near the planar portion 28. The second wall face 44 contacts an opening-side end of the flange portion 36a of the seat guide portion 32a. A stepped portion is provided between the first wall face 42 and the second wall face 44.

Each wall face 41b of the outer plate 14, which contacts the seat guide portion 32b of the corresponding spring seat 24, will be described. The wall face 41b has a third wall face 46 and a fourth wall face 48. The third wall face 46 contacts a portion of the seat guide portion 32b near the planar portion 28. The fourth wall face 48 contacts an opening-side end of the flange portion 36b of the seat guide portion 32b. A stepped portion is provided between the third wall face 46 and the fourth wall face 48.

Since the stepped portions are provided, the length of the clearance between the second wall face 44 and the fourth wall face 48 is larger than the length of the clearance between the first wall face 42 and the third wall face 46. When the spring seat 24 is fitted to the outer plate 14, the portion of the seat guide portion 32a near the planar portion 28 contacts the first wall face 42, and the opening-side end of the flange portion 36a of the seat guide portion 32a contacts the second wall face 44. The portion of the seat guide portion 32b near the planar portion 28 contacts the third wall face 46, and the opening-side end of the flange portion 36b of the seat guide portion 32b contacts the fourth wall face 48.

In this way, the seat guide portions 32a, 32b of each spring seat 24 contact the four portions, that is, the first to fourth wall faces 42, 44, 46, 48 of the outer plate 14, so rattling of each spring seat 24 with respect to the outer plate 14 is reduced, with the result that the position of the planar portion 28 of each spring seat 24 is stable. In addition, the planar portion 28 has a planar shape, and each spring 22 is supported by the planar portion 28, so the fluctuation of each spring 22 is suppressed, with the result that the position of each spring 22 is also stable.

For example, it is also presumable that the position of each spring seat 24 is not stable when the seat guide portions 32a, 32b of each spring seat 24 respectively contact the first wall face 42 and the third wall face 46 only. In contrast, since the flange portions 36a, 36b of the seat guide portions 32a, 32b respectively contact the second wall face 44 and the fourth wall face 48, the position of the spring seat 24 is stable. In each spring seat 24, when the opening-side ends of the flange portions 36a, 36b of the seat guide portions 32a, 32b, located the predetermined distance L from the planar portion 28, respectively contact the second wall face 44 and the fourth wall face 48, for example, even when force that changes the position of the planar portion 28 acts on the planar portion 28 via the spring 22, reaction force that acts in a direction to keep the position of the planar portion 28 occurs at the contact portion at which the seat guide portion 32a contacts the second wall face 44 or the contact portion at which the seat guide portion 32b contacts the fourth wall face 48, so a change in the position of the planar portion 28 is prevented.

At least the seat guide portions 32a, 32b of the spring seat 24 are made of a material softer than the spring 22, and the stiffness of the seat guide portions 32a, 32b of the spring seat 24 is lower than the stiffness of the spring 22. In this way, since the stiffness of the seat guide portions 32a, 32b of the spring seat 24 is lower than the stiffness of the spring 22, even if the spring 22 bends and contacts the spring seat 24, abrasion and breakage of the spring 22 are prevented.

Since the flange portions 36a, 36b of the seat guide portions 32a, 32b are respectively inclined away from the spring 22, even if the spring 22 bends and contacts the spring seat 24, the flange portions 36a, 36b of the seat guide portions 32a, 32b are prevented from getting caught in between the steel wires of the spring 22.

As described above, since one end of each spring 22 is received by the planar portion 28 of the corresponding spring seat 24, it is possible to support each spring 22 with a planar member without machining a corresponding one of the bottom wall faces 30 of the outer plate 14 into a planar shape. Since each spring seat 24 includes the seat guide portions 32a, 32b that contact the outer plate 14, the fluctuation of the spring seat 24 and the fluctuation of the spring 22 are suppressed by the seat guide portions 32a, 32b, so it is possible to reliably prevent interference of the spring 22 with its peripheral portion. Therefore, a load on each spring 22 is reduced, so it is possible to improve the durability of the one-way clutch 10.

The opening-side ends of the pair of seat guide portions 32a, 32b of each spring seat 24 contact the outer plate 14 in a state where the flange portions 36a, 36b located the predetermined distance L from the planar portion 28 are respectively expanded away from the corresponding spring 22. Therefore, force that suppresses the fluctuation of each spring seat 24 acts between each of the flange portions 36a, 36b of the seat guide portions 32a, 32b and the outer plate 14, so the position of each spring seat 24 is stable. Even when the spring 22 bends, the seat guide portions 32a, 32b are prevented from getting caught in between the steel wires of the spring 22.

In addition, since the stiffness of at least the seat guide portions 32a, 32b of each spring seat 24 is lower than the stiffness of the corresponding spring 22, even if the spring 22 bends and contacts the seat guide portions 32a, 32b, abrasion of the spring 22 is reduced.

Next, another embodiment will be described. In the following description, like reference numerals denote the same portions as those of the above-described embodiment, and the description thereof is omitted.

Figure 4:
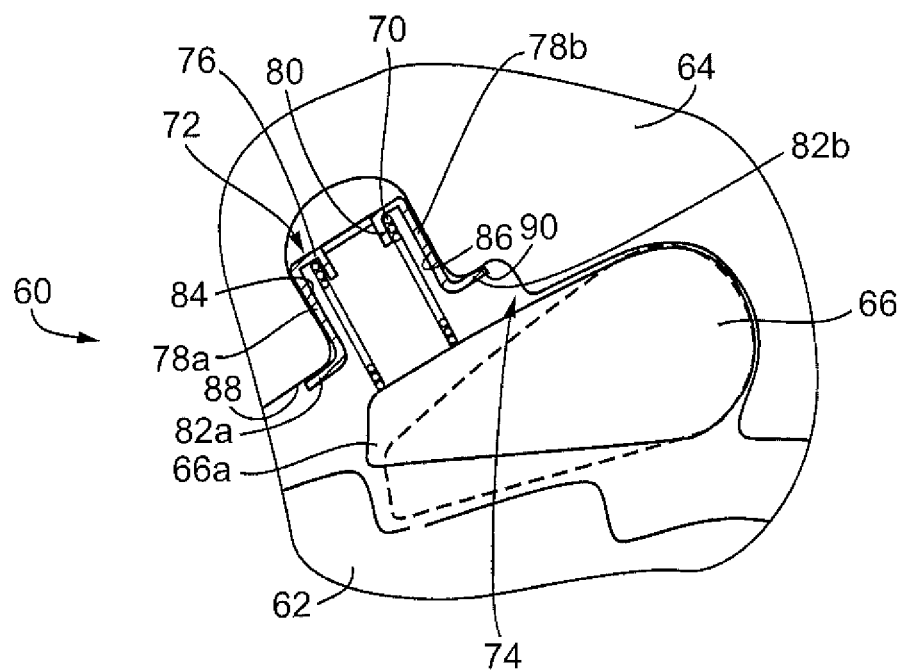
FIG. 4 is a view that shows the structure of each ratchet mechanism according to another embodiment of the present disclosure.

FIG. 4 shows the structure of each ratchet mechanism 60 according to another embodiment. The ratchet mechanisms 60 are provided between an inner plate 62 and an outer plate 64. Each of the ratchet mechanisms 60 includes a pawl 66, a spring 70, and a spring seat 72. The pawl 66 is provided in a state where the pawl 66 is pivotable toward the inner plate 62. The spring 70 is provided between the pawl 66 and the outer plate 64. The spring 70 pivots the pawl 66 toward the inner plate 62 by pressing the pawl 66 toward the inner plate 62. The spring seat 72 is connected to the outer plate 64, and supports the spring 70. In FIG. 4, the spring 70 and the spring seat 72 are shown in cross-sectional view. The inner plate 62 corresponds to the first member or the other member. The outer plate 64 corresponds to the second member or one member.

The outer plate 64 has pockets 74. Each pocket 74 is used to define a space that accommodates the pawl 66, the spring 70 and the spring seat 72. The pockets 74 are formed by pressing (punching).

Each ratchet mechanism 60 according to the present embodiment differs from each ratchet mechanism 16 according to the above-described embodiment in the shape of the spring seat 72 and the shape of the pocket 74 of the outer plate 64. Hereinafter, the structures of the outer plate 64 and each spring seat 72, different from those of the above-described embodiment, will be described.

Each spring seat 72 is fitted to a wall face (clearance) defined by a corresponding one of the pockets 74 of the outer plate 64. Each spring seat 72 includes a planar portion 76 and a pair of spring seat guide portions 78a, 78b. The planar portion 76 supports one end of the spring 70. The pair of spring seat guide portions 78a, 78b extend perpendicularly from the planar portion 76. Although not shown in FIG. 4, as in the case of the above-described embodiment, crimping portions and spring protection portions are provided. In the present embodiment as well, each spring seat 72 is formed of a metal plate, and is formed by pressing (punching). The spring seat guide portions 78a, 78b correspond to the pair of guide portions according to the present disclosure.

In the planar portion 76, a face that supports the spring 70 is formed in a planar shape. When the planar portion 76 is viewed in a direction perpendicular to the face that supports the spring 70, the planar portion 76 is formed in substantially a rectangular shape. The planar portion 76 has a cylindrical portion 80 at its center. The cylindrical portion 80 is used to position the spring 70.

The pair of spring seat guide portions 78a, 78b (hereinafter, the seat guide portions 78a, 78b) are formed by being bent perpendicularly from the planar portion 76. The seat guide portions 78a, 78b face each other across the spring 70 and extend parallel to the direction in which the spring 70 extends or contracts in a state where the spring 70 is connected to the spring seat 72.

Flange portions 82a, 82b are formed in the seat guide portions 78a, 78b at a position located a predetermined distance from the planar portion 76 so as to be bent perpendicularly away from the spring 70.

In the outer plate 64, each pocket 74 defines a first wall face 84 and a second wall face 86 that are parallel to the direction in which the spring 70 extends or contracts and that respectively contact the spring seat guide portions 78a, 78b. In addition, in the outer plate 64, each pocket 74 defines a third wall face 88 and a fourth wall face 90 that are parallel to the flange portions 82a, 82b and that respectively contact the flange portions 82a, 82b.

In this way, each spring seat 72 contacts the four portions, that is, the first to fourth wall faces 84, 86, 88, 90, so rattling of each spring seat 72 with respect to the outer plate 64 is reduced, with the result that the position of the planar portion 76 of each spring seat 72 is stable.

For example, it is also presumable that the position of the spring seat 72 is not stable when the seat guide portions 78a, 78b of each spring seat 72 respectively contact the first wall face 84 and the second wall face 86 only. In contrast, the flange portions 82a, 82b provided in the seat guide portions 78a, 78b respectively contact the third wall face 88 and the fourth wall face 90, so the position of each spring seat 72 is stable. When the flange portions 82a, 82b of each spring seat 72 contact the third wall face 88 and the fourth wall face 90, even when force that changes the position of the planar portion 78 acts on the planar portion 78, reaction force that acts in a direction to keep the position of the corresponding spring seat 72 occurs at the contact portion at which the flange portion 82a contacts the third wall face 88 or the contact portion at which the flange portion 82b contacts the fourth wall face 90, so a change in the position of each spring seat 72 is prevented.

In the present embodiment as well, at least the seat guide portions 78a, 78b of the spring seat 72 are made of a material softer than the spring 70, and the stiffness of the seat guide portions 78a, 78b of the spring seat 72 is lower than the stiffness of the spring 70. In this way, since the stiffness of the seat guide portions 78a, 78b of the spring seat 72 is lower than the stiffness of the spring 70, even if the spring 70 bends and contacts the seat guide portions 78a, 78b of the spring seat 72, abrasion and breakage of the spring 70 are prevented.

Since the flange portions 82a, 82b of the seat guide portions 78a, 78b are respectively inclined away from the spring 70, even if the spring 70 bends and contacts the spring seat 72, the seat guide portions 78a, 78b are prevented from getting caught in between the steel wires of the spring 70.

With the above-described configuration, it is possible to stabilize the position of each spring seat 72 without forming the wall face of the space, in which the spring seat 72 of the outer plate 64 is accommodated, in a planar shape. Therefore, the fluctuation of each spring 70 that is supported by the corresponding spring seat 72 is suppressed, so interference of each spring 70 with its peripheral portion is reliably prevented, with the result that it is possible to improve the durability of the one-way clutch.

The embodiments of the present disclosure are described in detail with reference to the accompanying drawings; however, the present disclosure is also applied to other embodiments.

For example, in the above-described embodiments, each spring seat 24 is provided on the outer plate 14 or each spring seat 72 is provided on the outer plate 64. Instead, each spring seat 24 may be provided on the inner plate 12, and the pawl 20 may be pressed toward the outer plate 14 by the spring 22, or each spring seat 72 may be provided on the inner plate 62, and the pawl 66 may be pressed toward the outer plate 64 by the spring 70.

In the above-described embodiment, the outer plate 14 rotates, and the rotation of the inner plate 12 is stopped. Instead, the rotation of the outer plate 14 may be stopped, and the inner plate 12 may rotate.

In the above-described embodiments, each spring seat 24 or each spring seat 72 has the spring protection portions 34a, 34b. Instead, the spring protection portions 34a, 34b are not necessarily required. Each spring seat 24 or each spring seat 72 does not need to have the spring protection portion 34a, 34b.

The above-described embodiments are only illustrative. The present disclosure may be implemented in modes including various modifications or improvements on the basis of the knowledge of persons skilled in the art.

What is claimed is:
1. A one-way clutch comprising:
a first member arranged around a rotation axis,
a second member arranged around the rotation axis so as to surround the first member, and
a ratchet mechanism provided between the first member and the second member, the ratchet mechanism being configured to permit relative rotation between the first member and the second member in one direction, and the ratchet mechanism being configured to stop relative rotation between the first member and the second member in the other direction,
the ratchet mechanism including
a pawl provided on one of the first member and the second member, the pawl being configured to pivot toward the other of the first member and the second member,
a spring provided between the pawl and the one of the first member and the second member, the spring being configured to press the pawl toward the other of the first member and the second member such that the pawl pivots toward the other of the first member and the second member, and
a spring seat connected to the one of the first member and the second member and that supports the spring, the spring being connected to the one of the first member and the second member via the spring seat,
the spring seat including
a planar portion having a planar shape for receiving one end of the spring, and
a pair of guide portions extending from the planar portion parallel in a direction in which the spring extends or contracts, the pair of guide portions contacting the one of the first member and the second member.

2. The one-way clutch according to claim 1, wherein the pair of guide portions of the spring seat each include a flange that expands away from the spring starting at a position located a predetermined distance from the planar portion, and
at least part of each flange is in contact with the one of the first member and the second member.

3. The one-way clutch according to claim 1, wherein the guide portions extend along the spring in a direction in which the spring extends.

4. The one-way clutch according to claim 1, wherein a stiffness of the guide portions is lower than a stiffness of the spring.

5. The one-way clutch according to claim 1, wherein the spring seat is positioned within a cavity of the one of the first member and the second member.

* * * * *